Sept. 8, 1925.  1,552,503
R. M. PIERSON
SWITCH FOR AUTOMOBILE SIGNALS
Filed Nov. 4, 1920
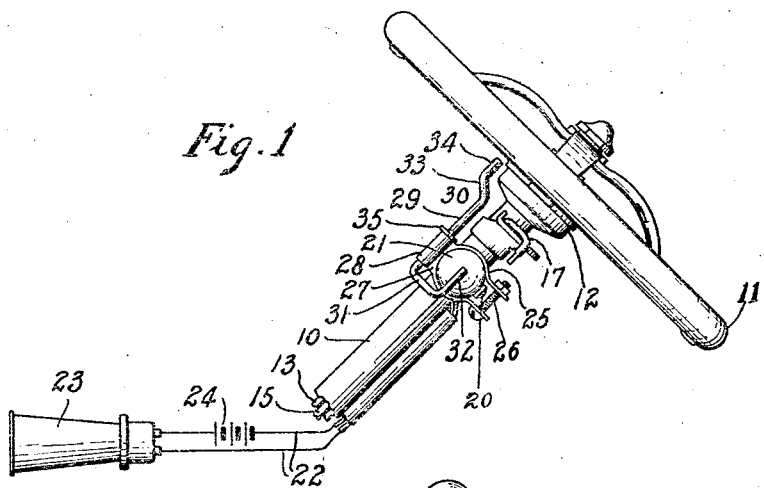
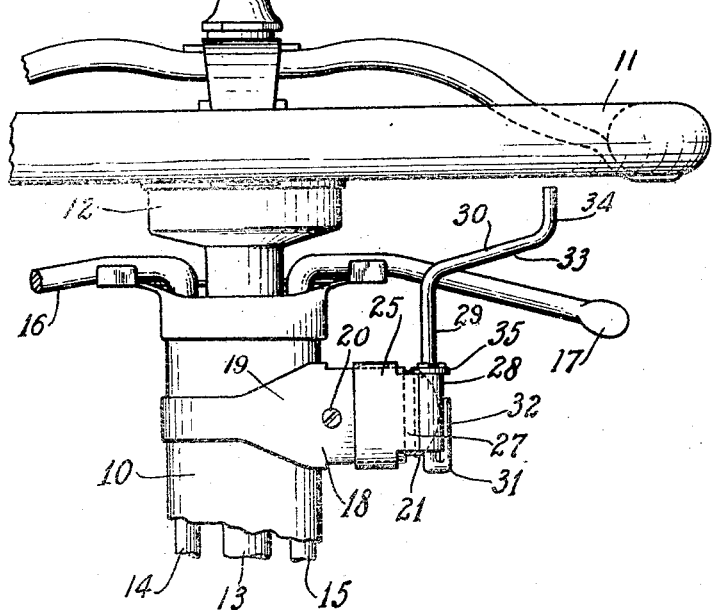
Inventor
Robert M. Pierson
By Dodge and Sons,
Attys.

Patented Sept. 8, 1925.

1,552,503

UNITED STATES PATENT OFFICE.

ROBERT M. PIERSON, OF AKRON, OHIO.

SWITCH FOR AUTOMOBILE SIGNALS.

Application filed November 4, 1920. Serial No. 421,718.

*To all whom it may concern:*

Be it known that I, ROBERT M. PIERSON, a citizen of the United States, residing at Akron, in the county of Summit and State of Ohio, have invented certain new and useful Improvements in Switches for Automobile Signals, of which the following is a specification.

This invention relates to automobile signals, and more particularly to switches for actuating the control circuits of electrically-operated horns, and its main object is to provide an improved lever type of signal actuator adapted to be operated by the driver with the fingers of his hand while said hand rests on the rim of the steering wheel. A further object is to construct such a device as an attachment for application to existing horn switches which are ordinarily difficult of access, so as to increase their ease of operation and the safety of driving.

Of the accompanying drawings,—

Fig. 1 is a side elevation, partly diagrammatic, showing the horn-circuit, steering wheel and adjacent parts of an automobile provided with a preferred form of my improved switch actuator.

Fig. 2 is a partial front elevation on a larger scale.

In the drawings, 10 is the fixed column surmounted by a steering wheel 11 which in this instance connects in a well-known manner, through gearing contained in a gear-box 12, with the steering shaft 13, passing through said column, there being also in said column the usual pair of shafts 14, 15, having at their upper ends, below the steering wheel, a pair of lever arms 16, 17, for controlling the carbureter throttle and the ignition advance respectively.

18 is the horn switch, of a common type, supported on the steering column near the upper end of the latter, and projecting out horizontally for a short distance, under the spark lever 17, said switch including a split casing 19 clamped around the column by means of a bolt 20, and a push-button 21 mounted in the outer end of said casing, together with suitable internal contacts controlling the horn circuit 22. 23 is the horn and 24 is a source of current, such as a battery, in said circuit. In some cases the push-button also controls the lights, and for that purpose has a rotary movement in addition to its axial horn-sounding movement. It will be understood, without showing those arrangements in the drawings, that my invention applies also to switches of that type.

25 is a split clamping collar embracing the switch casing 19 and frictionally secured thereon by means of a bolt 26 which draws together the projecting rear ends of said collar. The front outer edge of this collar is integrally formed with a member 27 bent into tubular form to constitute a bearing 28 in which is journaled the shaft 29 of a hand lever 30 of the first class, said lever having a lower arm 31 with an upturned end 32 engaging the middle of the push-button 21 opposite the opening embraced by the collar, and an upper crank-arm 33 projecting at an angle to said lower arm, approximating a right angle, and having an upwardly-turned end 34. Said end constitutes a finger-piece located within the circle of the rim of the steering-wheel 11 and in close proximity to said rim so as to be readily reached with a finger or fingers of the driver's left hand resting on the rim of the steering wheel. A thrust-washer 35 on the lever shaft 29 abuts against the upper end of the bearing 28 and limits the descent of said shaft in the bearing. The lever 30 projects upwardly in front of and to a point above the spark lever 17 and is so positioned as not to interfere with the extreme forward or spark-retarding movement of the latter. By using a lever of the first class, I obtain an advantageous relation of parts and secure the necessary travel of the push-button actuator 32 with a comparatively short motion of the handle 34.

The driver operates the lever 30 to sound the horn by drawing rearwardly on the finger-piece 34 so as to turn the shaft 29 in its bearing and cause the upturned end 32 of the lower arm to press the push-button 21 inwardly and close the switch contacts. This device is readily applied to the existing horn-switch equipment by merely slipping the collar 25 past the push button and over the switch casing 19 and then clamping it in place by screwing up the bolt 26, no disturbance of any of the switch parts being required in effecting this. Being always in the same location and requiring no shifting of the hand from the steering wheel, it is actuated with the least amount of attention and delay on the part of the operator, and it has the further advantage of dispensing with loose wires. While the direction of the shaft 29 may be varied by fixing the collar 25 in various angular positions on the switch-casing, the axis of said shaft is preferably substantially parallel with the steering post 13, as shown, which I believe to be a novel feature in horn switches and analogous signaling devices, affording the maximum facility of operation. The invention, however, is not wholly restricted to such an arrangement, nor to the making of the switch actuator as a separate attachment. The nearness of the finger-piece to the rim of the steering wheel is a matter of choice in the design of the article, and the expression "adjacent to the rim of the steering wheel" employed in certain of the appended claims, is intended to include any position accessible to a finger or fingers of the operator's hand without removing the hand from the rim of the wheel. The direction of pressure on said finger-piece in operating the lever may also be varied, depending upon the type of lever and manner of mounting the same. Furthermore, although the lever bearing is here shown as supported indirectly on the steering column 10, through the medium of the switch casing 19, it will be understood that wide variations may be made in its mode of support, as well as in the construction and arrangement of the lever, the manner of hinging or pivoting it, etc. In the particular arrangement shown, by having the pull of the collar 25 and its bolt 26 transverse to that of the bolt 20, or substantially parallel to the plane of separation of the halves of the switch-casing 19, it is found that the abutting edges of said casing are held in alinement at the split, and pinching of the push-button, which would cause the latter to stick, is avoided.

What is claimed is:—

1. In an automobile, the combination of a steering column surmounted by a steering wheel, a signal circuit, a switch controlling said circuit and having a casing projecting from one side of said column under the steering wheel, and a switch-actuating lever pivoted on the forward side of said casing on an axis substantially parallel with the column, and having a handle portion which projects upwardly and laterally to a position adjacent to the rim of the steering wheel.

2. In an autombile, the combination of a steering column surmounted by a steering wheel, a switch casing fastened to and projecting laterally from the column under said steering wheel and having a push-button at its outer end, a collar detachably embracing said casing and adapted to be applied and removed without disturbing the casing or its fastening, and a button-actuating lever mounted to turn on said collar and having a handle portion extending to a position adjacent to the rim of the steering wheel.

3. In an automobile, the combination of a steering column surmounted by a steering wheel, a signal switch having a casing projecting laterally from said column, under the wheel, and a push-button in the outer end of said casing, a clamping collar detachably embracing said casing and having a lever bearing at its front side, and a lever pivoted in said bearing and having a lower arm engaging the push-button and an upper arm extending to a point adjacent to the rim of the steering wheel.

4. An automobile signal-switch actuator comprising a clamping collar having a lever bearing, and a lever pivoted in said bearing and having an arm provided with a push-button engaging portion adapted to occupy a position opposite the opening embraced by the collar, and another arm located approximately at right-angles to the first-said arm and provided with a finger-piece at its end.

5. An extension actuator for automobile signal-switches comprising a split, clamping collar adapted to be slipped over the switch-casing and having means for contracting it thereon, and a lever pivoted at one edge of said collar and having a portion located over the opening in the collar and a finger portion remote from the collar.

6. In an automobile, the combination of a steering column surmounted by a steering wheel, a split switch-casing having a transverse bolt for clamping it on the column, a push-button in the outer end of the casing, a split collar having a clamping bolt adapted to contract it on said casing by pressure transverse to the direction of pressure of the casing bolt, and a button-actuator mounted on said collar and extending to a point adjacent to the rim of the steering wheel.

In testimony whereof I have signed my name to this specification.

ROBERT M. PIERSON.